United States Patent
Gupta et al.

(10) Patent No.: US 10,716,114 B2
(45) Date of Patent: Jul. 14, 2020

(54) OUTAGE NOTIFICATION AND CONTEXT PRESERVATION FOR ENERGY-HARVESTING DEVICES

(71) Applicant: Apple Inc., Cupertino, CA (US)

(72) Inventors: Maruti Gupta, Portland, OR (US); Rath Vannithamby, Portland, OR (US); Satish C. Jha, Hillsboro, OR (US); Kathiravetpillai Sivanesan, Richardson, TX (US); Mohammad Mamunur Rashid, Hillsboro, OR (US); Jing Zhu, Portland, OR (US)

(73) Assignee: APPLE INC., Cupertino, CA (US)

( * ) Notice: Subject to any disclaimer, the term of this patent is extended or adjusted under 35 U.S.C. 154(b) by 173 days.

(21) Appl. No.: 14/817,679

(22) Filed: Aug. 4, 2015

(65) Prior Publication Data

US 2017/0041915 A1    Feb. 9, 2017

(51) Int. Cl.
*H04W 72/04* (2009.01)
*H04W 4/70* (2018.01)
*H04W 52/02* (2009.01)
*H04L 5/00* (2006.01)
*H04L 12/26* (2006.01)

(52) U.S. Cl.
CPC ......... *H04W 72/048* (2013.01); *H04L 5/0055* (2013.01); *H04L 43/16* (2013.01); *H04W 4/70* (2018.02); *H04W 52/0206* (2013.01); *H04W 72/0406* (2013.01); *Y02D 70/00* (2018.01); *Y02D 70/1262* (2018.01); *Y02D 70/142* (2018.01); *Y02D 70/144* (2018.01); *Y02D 70/146* (2018.01); *Y02D 70/26* (2018.01)

(58) Field of Classification Search
CPC ...... H04L 5/0055; H04L 43/16; H04W 4/005; H04W 52/0206; H04W 72/048; H04W 72/0406; Y02B 60/50
See application file for complete search history.

(56) References Cited

U.S. PATENT DOCUMENTS

2013/0046821 A1* 2/2013 Alanara ............ H04W 52/0216
709/204
2013/0179715 A1* 7/2013 Sun ........................ G06F 1/3234
713/323

(Continued)

FOREIGN PATENT DOCUMENTS

WO    WO 2014/090269 A1    6/2014

*Primary Examiner* — Oussama Roudani (57) ABSTRACT

Technology described herein provides systems and technologies that help avoid waste of wireless network resources due to frequent losses of wireless connectivity with energy-harvesting devices (EHDs). An energy-harvesting-indicator communication can be sent from a wireless device to a cellular base station to inform the cellular base station that the wireless device is an EHD. The cellular base station can preserve context information and/or DL data pertaining to a wireless connection with the EHD when a wireless connection is lost due to a temporarily low level of available energy at the EHD. The context information and/or DL data can be preserved by the cellular base station until the period of time elapsed exceeds a threshold time value. Upon receiving a connection-resumption communication from the EHD, the cellular base station can use preserved context information to restore the wireless connection and proceed to send preserved DL data to the EHD.

21 Claims, 5 Drawing Sheets

(56) References Cited

U.S. PATENT DOCUMENTS

| | | | | |
|---|---|---|---|---|
| 2014/0115858 | A1* | 5/2014 | Pisu | H01M 10/42 29/407.05 |
| 2014/0293967 | A1* | 10/2014 | Kim | H04W 4/005 370/335 |
| 2015/0078230 | A1* | 3/2015 | Choi | H04W 74/04 370/311 |
| 2015/0305054 | A1* | 10/2015 | Elfstrom | H04W 52/0261 455/452.1 |
| 2015/0350971 | A1* | 12/2015 | Khay-Ibbat | H04W 36/0066 455/436 |
| 2016/0142900 | A1* | 5/2016 | Sandhu | H04W 8/005 455/435.1 |
| 2016/0219645 | A1* | 7/2016 | Turakhia | H04W 76/028 |
| 2016/0262041 | A1* | 9/2016 | Ronneke | H04W 52/0216 |
| 2016/0323694 | A1* | 11/2016 | Cui | H04L 47/12 |

* cited by examiner

OUTAGE NOTIFICATION AND CONTEXT PRESERVATION FOR ENERGY-HARVESTING DEVICES

BACKGROUND

Energy-harvesting devices (EHDs), also known as power-harvesting devices or energy-scavenging devices, can derive energy from a variety of sources such as sunlight, wind, fluid motion, and temperature gradients and store the energy in an energy-storage device (e.g., a battery or s super-capacitor). Some EHDs, such as EHDs comprising sensors in a wireless sensor network (WSN), are able to send and receive wireless communications.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

An energy-harvesting device (EHD) can harvest energy from one or more ambient energy sources. Existing technologies make it possible for EHDs to harvest energy from ambient sources such as sunlight, wind, temperature gradients, salinity gradients, vibrations (e.g., from sound), natural (or artificial) electromagnetic waves, biological processes, chemical interactions, and other processes. Photovoltaic cells, for example, can capture energy from sunlight, while piezoelectric devices can capture energy from mechanical strain. Pyroelectric devices can capture energy as a result of temperature changes, while thermoelectric devices can capture energy as a result of a temperature gradient. There are even some devices that are able to harvest energy from the oxidation of blood sugars and from metabolic processes of trees.

By capturing energy from sustainable ambient sources, EHDs can reduce the need to derive energy from costly and/or non-sustainable sources (e.g., chemical batteries or fossil fuels). In addition, because EHDs are often able to replenish their energy without human intervention (e.g., changing of batteries, refilling of fuel tanks, or plugging in to electrical outlets), EHDs can be well-suited for applications in which frequent human intervention would be expensive, time-consuming, impractical, or otherwise undesirable.

EHDs often comprise sensors that can measure quantities of interest in different locations and in different environments. In some examples, EHDs with sensors that monitor quantities such as heart rate and body temperature can be used in wearable or implantable medical devices. In other examples, EHDs can comprise sensors that monitor environmental conditions, such as ambient temperature, pressure, humidity, wind speed, and salinity.

In some examples, one or more EHDs that periodically make measurements of environmental conditions can be placed at various locations throughout an environment and configured to wirelessly communicate the measurements that are made to a cellular base station. This type of arrangement can be referred to as a wireless sensor network (WSN). In one example, a number of EHDs comprising sensors that measure temperature can be placed throughout a forest that is within the coverage area of a cellular base station. The EHDs can be configured to periodically make temperature measurements and wirelessly send the temperature measurements to the cellular base station. The temperature measurements from the EHDs can then, in turn, be transferred, stored, and/or used for any suitable purpose, such as determining temperature trends and temperature distributions in the forest over time or determining when a forest fire is imminent.

A cellular base station with which EHDs wirelessly communicate can comprise, for example, a node (e.g., a macro node or a low-power node (LPN)), or a transceiver station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. An EHD with wireless capability can be configured to communicate using at least one wireless communication standard (e.g., third generation partnership project (3GPP) long term evolution (LTE) Release 8, 9, 10, 11, or 12, Institute of Electronics and Electrical Engineers (IEEE) 802.16.2-2004, IEEE 802.16k-2007, IEEE 802.16-2012, IEEE 802.16.1-2012, IEEE 802.16p-2012, IEEE 802.16.1b-2012, IEEE 802.16n-2013, IEEE 802.16.1a-2013, High Speed Packet Access (HSPA), Bluetooth v4.0, Bluetooth v4.1, Bluetooth v4.2, IEEE 802.11a, IEEE 802.11b, IEEE 802.11g, IEEE 802.11n, IEEE 802.11ac, or IEEE 802.11ad, or another desired wireless communication standard).

Since environmental conditions and other phenomena from which EHDs harvest energy can vary, the rate at which EHDs harvest energy can also vary accordingly. As a result, it is often helpful for an EHD to be coupled to an energy-storage device, such as a battery or a capacitor (e.g., a super-capacitor), that can be used to store energy harvested by the EHD so that the energy can be available for operations performed at the EHD (e.g., sensory inputs, processing of data, and sending and receiving wireless transmissions) regardless of whether those operations are performed concurrently with the actual harvesting. Nevertheless, if the rate at which the EHD harvests energy falls below the rate at which energy is consumed and/or lost by the EHD for period of time long enough to deplete the energy stored in the energy-storage device, the amount of energy available to the EHD may decrease to a point where energy-consuming operations at the EHD need to be temporarily halted until sufficient energy is again available.

Wireless operations, in particular, may need to be temporarily halted by an EHD when the level of energy immediately available to the EHD is low. Some illustrative examples of wireless operations include sending uplink (UL) communications and/or data (e.g., measurements) and receiving downlink (DL) communications and/or data via a wireless connection to a cellular base station. This poses a problem because the protocols that cellular base stations currently observe when wireless connections are interrupted are not designed to efficiently address the situation in which an EHD frequently halts—and subsequently seeks to resume—wireless communications.

Figure 1A:
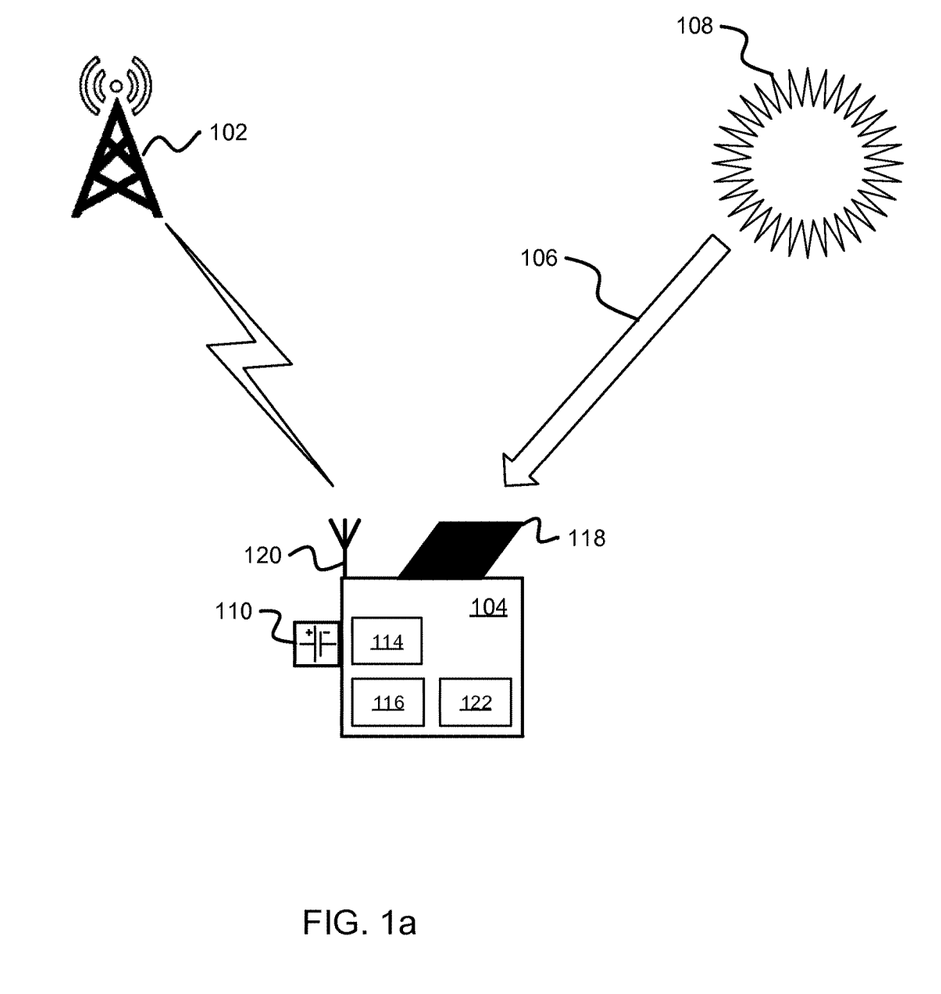
FIGS. 1a-1b illustrate a scenario in which a level of available energy at an EHD can decrease to a point where a wireless connection with a cellular base station may need to be temporarily halted in accordance with an example.
Figure 1B:
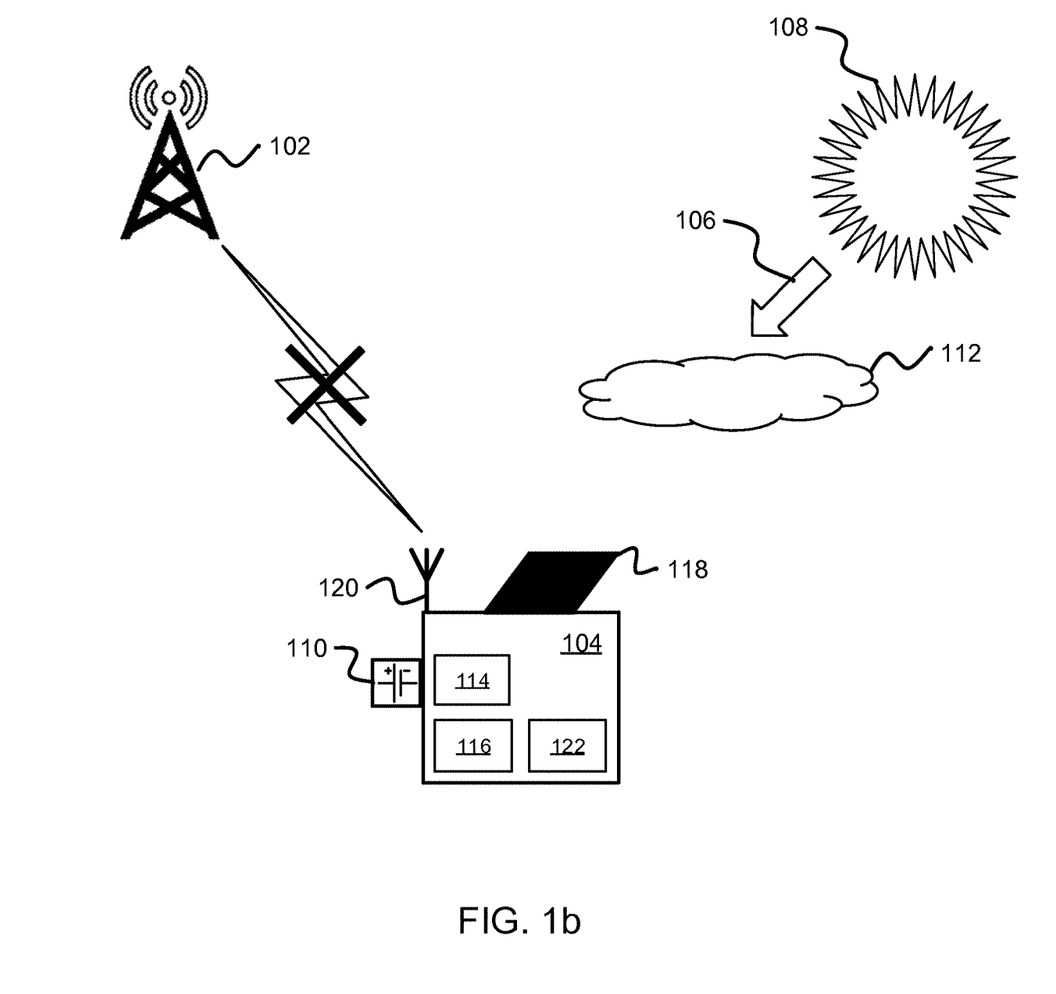

FIGS. 1a-1b illustrate an exemplary scenario in which a level of available energy at an EHD 104 can decrease to a point where a wireless connection with a cellular base station 102 may need to be temporarily halted until sufficient energy becomes available at the EHD 104. In one example, the EHD 104 can harvest energy from sunlight 106 emitted from the sun 108 using one or more solar panels 118, as shown in FIG. 1a. The EHD 104 can be electrically connected to an energy-storage device 110 wherein energy harvested by the EHD 104 from the sunlight 106 is stored. The EHD 104 can use energy stored in the energy-storage device 110 to power transceiver circuitry 114 at the EHD 104. The transceiver circuitry 114 at the EHD 104 can be used send wireless communications to, and/or receive wireless communications from, a cellular base station 102 via one or more antennas 120. The EHD can also comprise one or more processors 116 and one or more sensors 122. The one or more sensors 122 can comprise, for example, sensors that measure temperature, pressure, humidity, or another desired metric.

As shown in FIG. 1b, if a cloud 112 obstructs the sunlight 106, the EHD 104 may harvest energy at a reduced rate. If the rate of energy expended at the EHD 104 exceeds the rate at which energy is harvested at the EHD 104, the energy that is stored in the energy-storage device 110 may eventually be reduced to the point where there is no longer sufficient energy available to the EHD 104 to maintain the wireless connection with the cellular base station 102.

In general, cellular base stations are designed to deal with interruptions of wireless connections that can be due to many different issues, such as poor channel conditions, excessive interference, and movement of wireless devices out of coverage areas. Since some interruptions may be only momentary, if a cellular base station does not receive an acknowledgement from a wireless device verifying that DL data sent to the wireless device via a wireless connection was received, the cellular base station may resend the DL data multiple times and wait for an acknowledgment before inferring that the wireless connection has been lost or dropped. If the wireless device is an EHD that failed to send an acknowledgment because of an insufficient energy level at the EHD, though, the cellular base station's repeated sending of the DL data can be wasteful.

In addition, when a cellular base station finally infers that the wireless connection with the wireless device has been lost, context information pertaining to the wireless connection is typically deleted. The context information can include, for example, a Cell Radio Network Temporary Identifier (C-RNTI) associated with the wireless device. The cellular base station may also delete buffered DL data that was waiting to be sent to the wireless device. If the wireless device is an EHD that soon regains connectivity with the cellular base station, a new C-RNTI will need to be assigned, DL data will have to be re-buffered, and other overhead operations may need to be performed to restore the wireless connection. The amount of power used to reconnect and setup wireless bearers with a base station can be significant for an EHD with a relatively small energy storage capacity.

Systems and technologies in accordance with the present disclosure can include an energy-harvesting-indicator communication that can be sent from a wireless device to a cellular base station in order to inform the cellular base station that the wireless device is an EHD. An EHD can also be configured to send a power-outage communication to a cellular base station indicating a likelihood that the EHD will drop a wireless connection with the cellular base station due to a level of energy at the EHD being low. When the level of energy available at a UE, operating as an EHD, is sufficiently replenished (e.g., due to energy-harvesting activities), the EHD can also send a connection-resumption communication to the cellular base station indicating that the level of energy at the EHD is sufficiently high for the wireless connection to be resumed.

The cellular base station, being apprised of the energy-harvesting nature of the EHD by the energy-harvesting-indicator communication or by the power-outage communication, can be configured to preserve context information and/or DL data pertaining to a wireless connection with an EHD when the wireless connection is lost due to a temporarily low level of available energy at the EHD. The cellular base station can infer that the wireless connection was lost due to a temporarily low level of available energy at the EHD based on, for example, a failure to receive an acknowledgment from an EHD that has previously sent an energy-harvesting-indicator communication or a power-outage communication.

In one embodiment, the cellular base station can include a timer that can measure a period of time elapsed since a most recent wireless data exchange between the cellular base station and the EHD (e.g., since an acknowledgement was received from the EHD). The context information and/or DL data can be preserved by the cellular base station until the period of time elapsed exceeds a threshold time value. Upon receiving a connection-resumption communication from the EHD, the cellular base station can use preserved context information to restore the wireless connection and proceed to send preserved DL data to the EHD. This can significantly reduce the amount of energy used by a UE operating as an EHD to reconnect with a base station after an outage due to a low energy level.

Figure 2:
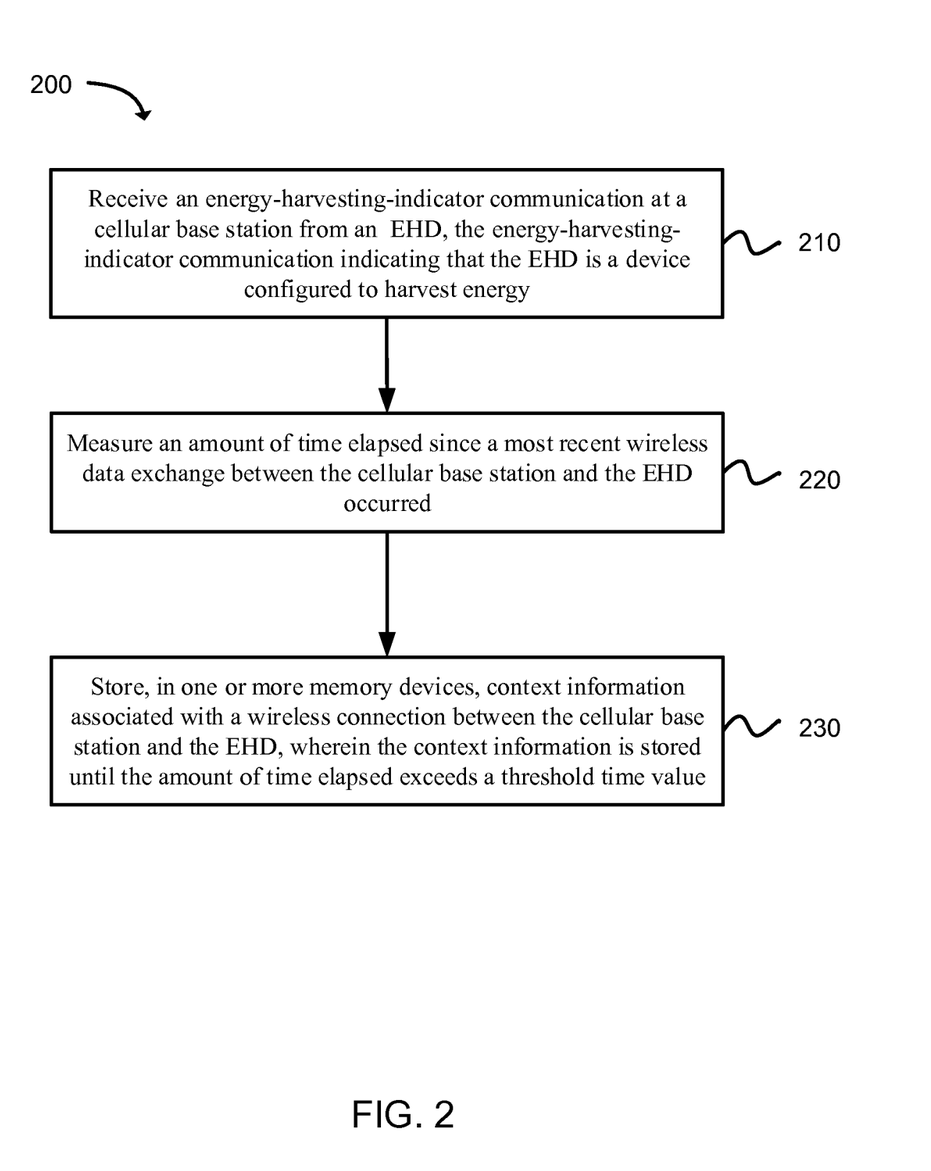
FIG. 2 illustrates exemplary functionality 200 of a cellular base station in accordance with an example.

FIG. 2 illustrates exemplary functionality 200 of an apparatus of a cellular base station in accordance with an example. As in 210, the apparatus of the cellular base station can comprise circuitry (e.g., circuitry including a transceiver and a baseband processor) that can receive an energy-harvesting-indicator communication from an EHD (e.g., a UE) via a wireless connection. The energy-harvesting-indicator communication can indicate that the EHD is a device configured to harvest energy. The energy-harvesting-indicator communication can be received, for example, by a transceiver at the cellular base station via one or more antennas.

In some examples, the apparatus of the cellular base station can also comprise circuitry (e.g., circuitry including a transceiver and a baseband processor) that can receive a power-outage communication from the EHD via one or more antennas. The power-outage communication can indicate a likelihood that the EHD will drop the wireless connection due to a level of energy at the EHD being low. In some examples, the power-outage communication can comprise a single bit, wherein a bit value of 1 indicates that the level of energy at the EHD is low. Alternatively, a bit value of 0 may be used to indicate the level of energy at the EHD is low.

As in 220, the apparatus of the cellular base station can further comprise circuitry (e.g., circuitry including one or more processors) that can measure an amount of time elapsed since a most recent wireless data exchange between the cellular base station and the EHD occurred. In some examples, the circuitry that measures the amount of time elapsed can be an identification (ID) reallocation-restriction timer. The identification (ID) reallocation-restriction timer can be, for example, a software timer that uses a clock oscillator that is built into hardware at the cellular base station, or an electronic timer. Alternatively, the apparatus of the cellular base station can also use an electromechanical timer or even a mechanical timer to measure the amount of time elapsed.

In some examples, at the apparatus of the cellular base station can comprise circuitry (e.g., one or more processors) configured to identify that the wireless connection has been lost is due to a power outage of the EHD based on one or more of: the power-outage communication, the energy-harvesting-indicator communication, or a failure to receive an Acknowledgment (ACK) or Non-Acknowledgement (NACK) from the EHD.

As in 230, the apparatus of the cellular base station can comprise circuitry configured to store context information associated with a wireless connection between the cellular base station and the EHD in one or more memory devices until the amount of time elapsed meets or exceeds a threshold time value. The context information can comprise a Cell Radio Network Temporary Identifier (C-RNTI) that is associated with the wireless connection. In some examples, the context information can comprise a specific EHD identifier that is associated with the wireless connection and the context information. In some examples, the circuitry can also be configured to store (e.g., in the one or more memory devices) downlink (DL) data that is buffered for the UE until the amount of time elapsed meets or exceeds a threshold time value. In some examples, the data can be stored by being buffered in the one or more memory devices. In examples where DL data is stored, the EHD identifier can also be associated with the DL data.

In some examples, the number of possible EHD identifiers can exceed the number of possible C-RNTIs; this can limit the amount of time the timer can operate to allow the cellular base station to preserve the context for a larger number of EHDs. Accordingly, a larger number of identifiers can be created so that the number of identifiers does not run out. For example, a C-RNTI may be combined with a MAC address of the EHD to create a larger number of identifiers, thereby enabling the timer to operate for a longer period without the risk of running out of C-RNTI values. This example is not intended to be limiting. A unique identifier for each EHD can be created in any number of ways to allow context information to be preserved at the base station for the EHD.

In some examples, the apparatus of the cellular base station can comprise circuitry (e.g., a transceiver) configured to receive a connection-resumption communication from the EHD via one or more antennas. The connection-resumption communication can indicate that the level of energy at the EHD is sufficiently high for the wireless connection to be resumed. If the amount of time elapsed does not exceed the threshold time value when the connection-resumption communication is received, circuitry (e.g., one or more processors) at the cellular base station can then use the stored context information to resume the wireless connection with the EHD.

If the wireless connection is successfully resumed, the circuitry at the apparatus of the cellular base station (e.g., a transceiver) can resume sending any DL data that was stored (e.g., buffered in the one or more memory devices) for the UE at the time when the wireless connection was lost. If the UE was scheduled to send an uplink (UL) communication at the time when the wireless connection was lost, the circuitry at the apparatus of the cellular base station can provide the EHD (e.g., by having one or more processors allocate radio resources) with a grant (e.g., of the radio resources) to send the UL communication. The EHD can be notified of this grant via a communication sent from the circuitry (e.g., using a transceiver).

Figure 3:
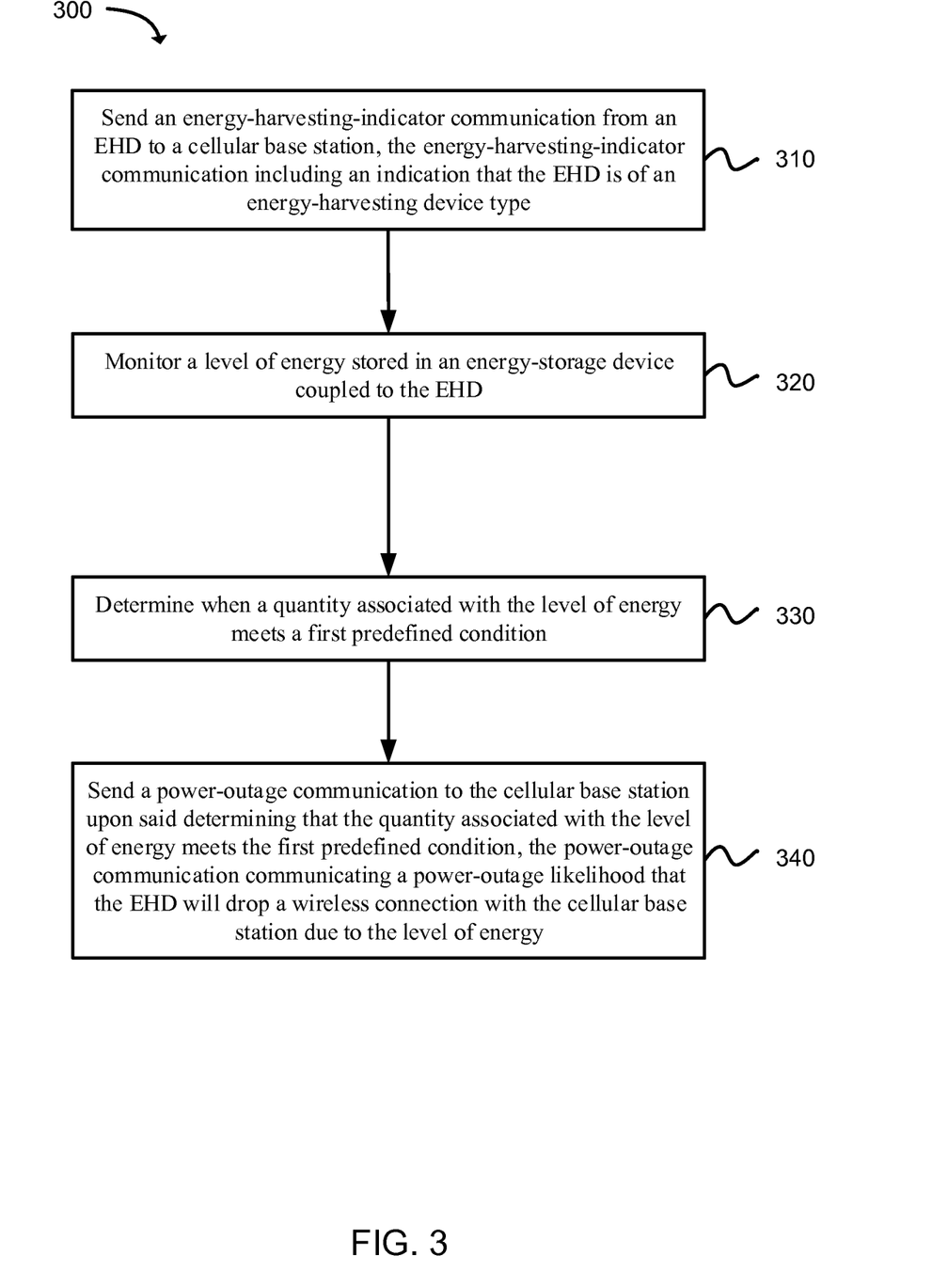
FIG. 3 illustrates exemplary functionality of an EHD (e.g., a UE) in accordance with an example.

FIG. 3 illustrates exemplary functionality 300 of an apparatus of an EHD (e.g., a UE) in accordance with an example. As in 310, the apparatus of the EHD can comprise circuitry (e.g., a transceiver) configured to send an energy-harvesting-indicator communication to the cellular base station via one or more antennas. The energy-harvesting-indicator communication can include an indication that the EHD is of an energy-harvesting device type. In some examples, the EHD can harvest one or more of: photovoltaic energy, piezoelectric energy, pyroelectric energy, thermoelectric energy, metabolic energy, or biomechanical energy. In some examples, the EHD can comprise a sensor. In addition, in some examples, the EHD can be associated with a WSN.

As in 320, the apparatus of the EHD can comprise circuitry configured to monitor a level of energy stored in an energy-storage device coupled to the EHD. In some examples, the energy storage device can comprise one or more of: a battery or a capacitor. There are many ways in which a level of energy (e.g., a state of charge (SOC)) can be monitored. In one example, the circuitry can apply a current-based approach, such as Coulomb counting, to monitor the level of energy stored in the energy-storage device. In some examples, Coulomb counting can be applied using input from one or one or more of: a current shunt, a Hall-effect transducer, or a Giant Magnetoresistance (GMR) magneto-resistive sensor at the EHD. In other examples, voltage-based or impedance-based approaches can be used to monitor the level of energy stored in the energy-storage device.

As in 330, the apparatus of the EHD can comprise circuitry configured to determine when a quantity associated with the level of energy meets a first predefined condition. In some examples, the quantity associated with the level of energy may be a voltage or a current level. In some examples, the quantity associated with the level of energy may be a rate of change, such as a rate at which voltage or current is decreasing or a rate at which the current is accelerating. The first predefined condition can be, for example, that the quantity meets or exceeds a threshold level. In another example, the first predefined condition can be that the quantity meets or falls below a threshold level.

As in 340, upon determining that the quantity meets the predefined condition (e.g., when the quantity meets, exceeds, or falls below a threshold level), the circuitry can be configured to send a power-outage communication to the cellular base station (e.g., using a transceiver and one or more antennas). The power-outage communication can communicate a likelihood that the EHD will drop a wireless connection with the cellular base station due to the level of energy stored in the energy-storage device.

By monitoring the level of energy, the circuitry can gather data from which the quantity associated with the level of energy can be determined. For example, if the quantity associated with the level of energy is a rate of change such as the first or second derivative of the level of energy, the circuitry (e.g., a processor) may calculate the rate of change based on measurements of the level of energy made over time.

In some examples, the apparatus of the EHD can also comprise circuitry configured to detect when the wireless connection has been dropped due to the energy level. Furthermore, in some examples, the apparatus of the EHD can further comprise circuitry configured to determine when the quantity associated with the level of energy meets a second predefined condition (e.g., when the level of energy stored in the energy-storage device is sufficient for the EHD to resume the wireless connection with the cellular base station). The second predefined condition can be, for example, that the quantity meets or exceeds a threshold level. In another example, the second predefined condition can be that the quantity meets or falls below a threshold level. The circuitry (e.g., using a transceiver) can then send a connection-resumption communication to the cellular base station. The connection-resumption communication can indicate to the cellular base station that the level of energy is sufficient for the EHD to resume the wireless connection.

Figure 4:
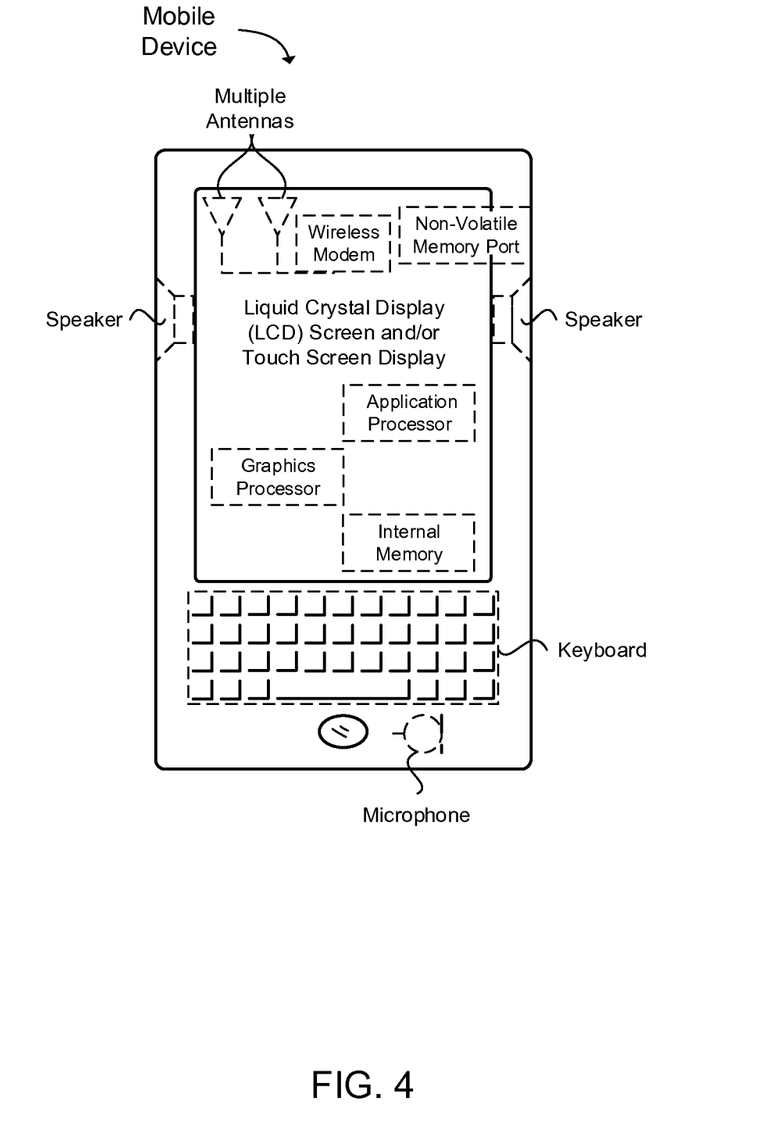
FIG. 4 provides an example illustration of a wireless device in accordance with an example.

FIG. 4 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 4 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general-purpose processors, specialized processors such as VLSI, FPGAs, and other types of specialized processors, as well as base-band processors used in transceivers to send, receive, and process wireless communications.

It should be understood that many of the functional units described in this specification have been labeled as modules, in order to more particularly emphasize their implementation independence. For example, a module can be implemented as a hardware circuit (e.g., an application-specific integrated circuit (ASIC)) comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous.

Furthermore, the described features, structures, or characteristics can be combined in any suitable manner in one or more embodiments. In the foregoing description, numerous specific details are provided, such as examples of layouts, distances, network examples, etc., to provide a thorough understanding of some embodiments. One skilled in the relevant art will recognize, however, that the some embodiments can be practiced without one or more of the specific details, or with other methods, components, layouts, etc. In other instances, well-known structures, materials, or operations are not shown or described in detail to avoid obscuring aspects of different embodiments.

While the forgoing examples are illustrative of the principles used in various embodiments in one or more particular applications, it will be apparent to those of ordinary skill in the art that numerous modifications in form, usage and details of implementation can be made without the exercise of inventive faculty, and without departing from the principles and concepts of the embodiments. Accordingly, it is not intended that the technology be limited, except as by the claims set forth below.

What is claimed is:

1. An apparatus of a cellular base station capable of wirelessly communicating with an energy-harvesting device (EHD), the apparatus comprising circuitry configured to:
   receive an energy-harvesting-indicator communication from the EHD, the energy-harvesting-indicator communication indicating that the EHD is a device configured to harvest energy;
   start an identification (ID) reallocation-restriction timer when a wireless data exchange occurs between the cellular base station and the EHD;
   receive a power-outage communication from the EHD, the power-outage communication indicating a likelihood that the EHD will drop the wireless connection due to a level of energy at the EHD being low;
   receive a connection-resumption communication from the EHD, the connection-resumption communication indicating that the level of energy at the EHD is sufficiently high for the wireless connection to be resumed to enable data to be communicated;
   store, in one or more memory devices, context information associated with a wireless connection between the cellular base station and the EHD, wherein the context information is stored until the ID reallocation-restriction timer expires, wherein the context information comprises a specific EHD identifier that is associated with the wireless connection, the context information and with downlink data for the EHD;
   buffer, in the one or more memory devices, downlink data (DL) associated with a wireless connection between the cellular base station and the EHD, wherein the DL data is buffered until the ID reallocation-restriction timer expires; and
   use the context information to resume the wireless connection with the EHD and send the buffered downlink (DL) data to the EHD when the connection-resumption communication is received when the ID reallocation-restriction timer has not expired.

2. The apparatus of claim 1, wherein the circuitry is further configured to:
   receive a power-outage communication from the EHD, the power-outage communication indicating a likelihood that the EHD will drop the wireless connection due to a level of energy at the EHD being low; and
   identify that a loss of the wireless connection is due to a power outage of the EHD based on the power-outage communication.

3. The apparatus of claim 2, wherein the power-outage communication comprises a single bit, wherein a bit value of 1 indicates that the level of energy at the EHD is low.

4. The apparatus of claim 1, wherein the circuitry is further configured to resume an uplink (UL) communication from the EHD when the wireless connection with the EHD is successfully resumed by providing the EHD with a grant to send the UL communication.

5. The apparatus of claim 2, wherein the circuitry is further configured to identify that the loss of the wireless connection is due to a power outage of the EHD based on the power-outage communication and based on a failure to receive an Acknowledgment (ACK) or Non-Acknowledgement (NACK) from the EHD.

6. The apparatus of claim 1, wherein downlink (DL) data for the EHD is stored in the one or more memory devices until the circuitry determines that the ID reallocation-restriction timer has expired.

7. The apparatus of claim 1, wherein the context information comprises a temporary identifier that is a not associated with a Cell Radio Network Temporary Identifier (C-RNTI) to enable additional identifiers to be available for storing context information of the EHD for the duration of the ID reallocation-restriction timer.

8. The apparatus of claim 1, wherein the EHD is a user equipment (UE).

9. An apparatus of an Energy-Harvesting Device (EHD) configured to wirelessly communicate with a cellular base station, the apparatus comprising circuitry configured to:
  send an energy-harvesting-indicator communication to the cellular base station, the energy-harvesting-indicator communication including an indication that the EHD is of an energy-harvesting device type;
  monitor a level of energy stored in an energy-storage device coupled to the EHD;
  determine when a quantity associated with the level of energy meets a first predefined condition;
  send a power-outage communication to the cellular base station upon said determining that the quantity associated with the level of energy meets the first predefined condition, the power-outage communication communicating a power-outage likelihood that the EHD will drop a wireless connection with the cellular base station due to the level of energy;
  not reallocate an EHD identification (ID) of an EHD that was dropped for a duration of an ID reallocation-restriction timer operating at the cellular base station, wherein the ID reallocation-restriction timer is started when a wireless data exchange occurs between the cellular base station and the EHD; and
  store, in one or more memory devices, context information associated with a wireless connection between the cellular base station and the EHD, wherein the context information comprises a temporary identifier that is a not associated with a Cell Radio Network Temporary Identifier (C-RNTI) to enable additional identifiers to be available for storing context information of the EHD until expiry of the ID reallocation-restriction timer, wherein the context information comprises a specific EHD identifier that is associated with the wireless connection, the context information and with downlink data for the EHD;
  buffer, in the one or more memory devices, downlink data (DL) associated with a wireless connection between the cellular base station and the EHD, wherein the DL data is buffered until expiry of the ID reallocation-restriction timer; and
  use the context information to resume the wireless connection with the EHD and send the buffered downlink (DL) data to the EHD when the connection-resumption communication is received when the ID reallocation-restriction timer has not expired.

10. The apparatus of claim 9, wherein the circuitry is further configured to:
  detect when the wireless connection has been dropped due to the energy level;
  determine when the quantity associated with the level of energy meets a second predefined condition; and
  send a connection-resumption communication to the cellular base station upon said determining when the quantity associated with the level of energy meets the second predefined condition, the connection-resumption communication indicating that the energy level is sufficient for the EHD to resume the wireless connection with the cellular base station.

11. The apparatus of claim 9, wherein the EHD harvests one or more of: photovoltaic energy, piezoelectric energy, pyroelectric energy, thermoelectric energy, metabolic energy, or biomechanical energy.

12. The apparatus of claim 9, wherein the energy-storage device coupled to the EHD comprises one or more of: a battery or a capacitor.

13. The apparatus of claim 9, wherein the EHD is a user equipment (UE).

14. The apparatus of claim 9, wherein the apparatus further comprises a sensor and a transceiver.

15. The apparatus of claim 14, wherein the EHD is associated with a wireless sensor network (WSN).

16. The apparatus of claim 9, wherein the circuitry is further configured to monitor the level of energy in the energy-storage device by applying Coulomb counting using input from one or one or more of: a current shunt, a Hall-effect transducer, or a Giant Magnetoresistance (GMR) magneto-resistive sensor.

17. The apparatus of claim 9, wherein the quantity associated with the level of energy comprises a rate of change.

18. A non-transitory computer-readable storage medium having instructions thereon which, when executed by one or more processors, perform the following:
  monitoring a level of energy stored in an energy-storage device at an Energy-Harvesting Device (EHD), the EHD having a wireless connection to a cellular base station;
  determining when a quantity associated with the level of energy meets a first predefined condition;
  sending a power-outage communication to the cellular base station upon said determining when the quantity associated with the level of energy meets the first predefined condition, the power-outage communication indicating a likelihood that the EHD will drop the wireless connection due to the energy level;
  not reallocate an EHD identification (ID) of an EHD that was dropped for a duration of an ID reallocation-restriction timer operating at the cellular base station, wherein the ID reallocation-restriction timer is started when a wireless data exchange occurs between the cellular base station and the EHD; and
  store, in one or more memory devices, context information associated with a wireless connection between the cellular base station and the EHD, wherein the context information comprises a temporary identifier that is a not associated with a Cell Radio Network Temporary Identifier (C-RNTI) to enable additional identifiers to be available for storing context information of the EHD until expiry of the ID reallocation-restriction timer, wherein the context information comprises a specific EHD identifier that is associated with the wireless connection, the context information and with downlink data for the EHD;
  buffer, in the one or more memory devices, downlink data (DL) associated with a wireless connection between the cellular base station and the EHD, wherein the DL data is buffered until expiry of the ID reallocation-restriction timer; and
  use the context information to resume the wireless connection with the EHD and send the buffered downlink (DL) data to the EHD when the connection-resumption communication is received when the amount of time elapsed does not exceed a threshold time value.

19. The non-transitory computer-readable storage medium of claim 18, further having instructions thereon which, when executed by one or more processors, perform the following:
   detecting when the wireless connection has been dropped;
   determining when the quantity associated with the level of energy meets a second predefined condition; and
   sending a connection-resumption communication to the cellular base station upon said determining when the quantity associated with the level of energy meets the second predefined condition, the connection-resumption communication indicating that the level of energy is sufficient for the EHD to resume the wireless connection with the cellular base station.

20. The non-transitory computer-readable storage medium of claim 18, wherein the quantity associated with the level of energy comprises a rate of change.

21. The apparatus of claim 1, wherein the circuitry is further configured to not reallocate an EHD identification (ID) of an EHD that was dropped for a duration of the ID reallocation-restriction timer operating at the cellular base station.

\* \* \* \* \*